3,294,561
BRONZE-SMOKE SEGMENT GLASS
James E. Duncan, Natrona Heights, and Joseph E. Cooper, Brackenridge, Pa., assignors to Pittsburgh Plate Glass Company, Pittsburgh, Pa., a corporation of Pennsylvania
No Drawing. Filed Mar. 5, 1965, Ser. No. 437,601
5 Claims. (Cl. 106—54)

The present invention relates to new segment glasses used in the fabrication of fused uniform color trifocal ophthalmic lenses. More particularly, the present invention relates to bronze-smoke colored barium segment glasses having indices of refraction of 1.587 to 1.593 and total luminous transmittances of 25 percent for a two millimeter glass thickness.

The bronze-smoke colored segment glasses of the present invention also have indices of refraction, softening points, and thermal expansion characteristics which make them suitable for use as the intermediate segment portions of trifocal ophthalmic lenses. The glasses herein disclosed are particularly suitable for fusing to the bronze-smoke crown glasses disclosed in our copending application Serial No. 420,793, filed December 23, 1964.

The glasses of the present invention are described by the calculated compositional ranges presented below:

| Component: | Percent by weight |
|---|---|
| $SiO_2$ | 45 to 50 |
| $Na_2O$ | 5 to 9 |
| $K_2O$ | 1 to 7 |
| $BaO$ | 18 to 30 |
| $B_2O_3$ | 3 to 6 |
| $CaO$ | 3 to 7 |
| $TiO_2$ | 1 to 5 |
| $ZrO_2$ | 1 to 4 |
| $ZnO$ | 0 to 6 |
| $Sb_2O_5$ | 0.0 to 2.0 |
| $Al_2O_3$ | .1 to 4 |
| $CoO$ | .001 to .008 |
| $NiO$ | .1 to .5 |

The batch ingredients for two typical segment glasses are given in Table I below. All ingredients are given in parts by weight.

TABLE I

| Batch Ingredient | A | B |
|---|---|---|
| Sand | 995 | 907 |
| Potassium Carbonate | 152 | 45 |
| Barium Carbonate | 527 | 721 |
| Soda Ash | 232 | 190 |
| Sodium Nitrate | 50 | 50 |
| Boric Acid | 166 | 128 |
| Calcium Carbonate | 201 | 183 |
| Titanium Dioxide | 64 | 39 |
| Zirconium Silicate | 46 | 50 |
| Zinc Oxide | 100 | |
| Alumina Hydrate | 36 | |
| Antimony Oxide | 11 | |
| Sodium Antimonate | | 13 |
| Nickel Oxide | 7.32 | 6.60 |
| Cobalt Oxide | 0.108 | 0.097 |

The calculated glass compositions of A and B are presented in Table II. All oxide percentages are in percent by weight.

TABLE II

| Component | Percent by Weight | |
|---|---|---|
| | A | B |
| $SiO_2$ | 47.7 | 48.3 |
| $Na_2O$ | 7.3 | 6.9 |
| $K_2O$ | 4.8 | 1.6 |
| $BaO$ | 19.3 | 29.4 |
| $B_2O_3$ | 4.4 | 3.8 |
| $CaO$ | 5.3 | 5.4 |
| $TiO_2$ | 3.0 | 2.1 |
| $ZrO_2$ | 1.4 | 1.7 |
| $ZnO$ | 4.7 | |
| $Sb_2O_5$ | 0.5 | 0.5 |
| $Al_2O_3$ | 1.2 | 0.1 |
| $CoO$ | 0.0051 | 0.0051 |
| $NiO$ | 0.3461 | 0.3461 |

Table III lists some of the significant optical and physical properties of glasses A and B.

TABLE III

| Property | Composition A | Composition B |
|---|---|---|
| Index of Refraction, $N_d$ | 1.5880 | 1.5925 |
| Softening point in degrees Fahrenheit | 1286 | 1300 |
| Coefficient of thermal expansion $\times 10^{-6}$ Per ° F. between 70 °F. and 575 °F. | 5.1 | 5.1 |
| Percent luminous transmittance at 2 mm. thickness | 25.0 | 25.0 |

The segment glasses herein described may have indices of refraction between 1.587 and 1.593, softening points from 1260° F. to 1310° F., and coefficients of thermal expansion between $4.8 \times 10^{-6}$ per °2F. and $5.3 \times 10^{-6}$ per ° F. in the temperature range from 70° F. to 5750° F.

The softening point is defined by the American Society for Testing Materials as the temperature at which the viscosity of the glass is $10^{7.6}$ poises.

The segment glasses of the present invention should be melted under neutral or slightly oxidizing conditions using conventional melting techniques.

The present invention will be more fully understood by reference to the following detailed example which is the preferred method contemplated by the inventor for carrying out his invention on a small scale:

*Example I*

An 18 pound batch of the dry raw materials indicated under A in Table I was weighed. The raw batch materials were mixed and approximately half of the batch was charged into a preheated ceramic crucible for melting. The crucible and batch were then heated in a furnace to a temperature of about 2450° F. for a period of two hours. The furnace temperature was then raised to 2500° F. and the remaining batch was charged and melted. The molten glass was then mechanically stirred for an hour to homogenize and fine the glass. Stirring was continued for an additional 1½ hours during which time the furnace temperature was reduced to 2000° F. During the next hour the temperature was lowered and held at about 1950° F. The glass was then removed from the furnace and poured from the crucible onto a preheated iron table. The glass was rolled to form a plate of glass approximately 12 inches by 20 inches by ⅜ inch thick. After the cast glass plate had sufficiently solidified in air, it was placed in a kiln preheated to 1100° F.

The glass plate was annealed in the kiln by cooling from 1100° F. to 850° F. at a rate of approximately 3° F. per minute. The power to the kiln was then turned off and the kiln was allowed to cool gradually to room temperature over a period of about 15 hours.

The annealed glass may be fabricated and used in the manufacture of trifocal ophthalmic lenses. To produce a trifocal lens which incorporates the type of glass herein disclosed requires selecting compatible glasses for the other portions of the composite lens.

A suitable crown glass for use as the lens blank is disclosed in our copending application Serial No. 420,793 filed December 12, 1964 and has the following calculated compositions:

| Component: | Percent by weight |
|---|---|
| $SiO_2$ | 69.2 |
| $Na_2O$ | 6.3 |
| $K_2O$ | 9.9 |
| ZnO | 6.7 |
| BaO | 1.5 |
| $Al_2O_3$ | 0.6 |
| $Fe_2O_3$ | 5.1 |
| CoO | 0.0112 |
| Se | 0.0940 |
| $Sb_2O_5$ | 0.6 |

This crown glass has a softening point of 1322° F., an index of refraction of 1.5230, a coefficient of thermal expansion of $4.9 \times 10^{-6}$ per ° F. over a temperature range of 70° F. to 575° F., a bronze-smoke color, and a total luminous transmittance of 21 percent for a 2 mm. thickness.

A suitable glass for use as the lower segment of the trifocal lens is disclosed in our copending application Serial No. 437,582 filed March 5, 1965 and has the following calculated composition.

| Component: | Percent by weight |
|---|---|
| $SiO_2$ | 39.2 |
| BaO | 19.3 |
| $Na_2O$ | 8.3 |
| $B_2O_3$ | 2.7 |
| CaO | 3.9 |
| $TiO_2$ | 2.8 |
| $ZrO_2$ | 6.5 |
| PbO | 16.7 |
| $Sb_2O_5$ | 0.4 |
| $Al_2O_3$ | 0.1 |
| CoO | 0.0041 |
| NiO | 0.2756 |

This lower segment glass has a softening point of about 1268° F., an index of refraction of 1.6534, a coefficient of thermal expansion of $5.1 \times 10^{-6}$ per ° F. between 70° F. and 575° F., a bronze smoke color and a total luminous transmittance of 25.0 percent for a 2 millimeter thickness.

A method of fabricating a trifocal lens is to fuse in an edge to edge relationship three glass segments each having a specific index of refraction. The specific indices of refraction required for each combination of glass components are either 1.5232, 1.5880 and 1.6537 or 1.5232, 1.5918 and 1.6600. When the composite button is fabricated it is then ground and polished to the proper curvature and fused into a countersunk area of the crown glass blank used as the major portion of the lens. The middle segment of the composite button is the trifocal segment of the finished lens and has an index of refraction of 1.588 or 1.592. One method of producing fused trifocal lenses is found in U.S. 2,112,659 issued to E. J. Reh on March 29, 1938.

The thermal expansion properties of all three glasses used in the lens must be similar to prevent stresses being created in the finished lens. The high index segment glasses must have softening points somewhat lower than the softening point of the crown glass to which they are fused.

While the present invention has been described by reference to specific glass compositions the scope of the present invention should be limited only by the language of the appended claims.

We claim:

1. A bronze-smoke glass consisting of essentially the following ingredients in percent by weight 45 to 50 percent $SiO_2$, 18 to 30 percent BaO, 5 to 9 percent $Na_2O$, 1 to 7 percent $K_2O$, 3 to 6 percent $B_2O_3$, 3 to 7 percent CaO, 1 to 5 percent $TiO_2$, 1 to 4 percent $ZrO_2$, 0 to 6 percent ZnO, 0.0 to 2 percent $Sb_2O_5$, .1 to 4 percent $Al_2O_3$, .001 to .008 percent CoO, and .1 to .5 percent NiO, and which exhibits a softening point between 1260 and 1310° F., an index of refraction of between 1.587 and 1.593, and a total luminous transmittance of between 23 and 27 percent for a thickness of 2 millimeters.

2. A bronze-smoke glass consisting essentially of 47.7 percent $SiO_2$, 19.3 percent BaO, 7.3 percent $Na_2O$, 4.8 percent $K_2O$, 4.4 percent $B_2O_3$, 5.3 percent CaO, 3.0 percent $TiO_2$, 1.4 percent $ZrO_2$, 4.7 percent ZnO, 0.5 percent $Sb_2O_5$, 1.2 percent $Al_2O_3$, .0051 percent CoO, and .3461 percent NiO.

3. A bronze-smoke glass consisting essentially of 48.3 percent $SiO_2$, 29.4 percent BaO, 6.9 percent $Na_2O$, 1.6 percent $K_2O$, 3.8 percent $B_2O_3$, 5.4 percent CaO, 2.1 percent $TiO_2$, 1.7 percent $ZrO_2$, .1 percent $Al_2O_3$, 0.5 percent $Sb_2O_5$, .0051 percent CoO and 0.3461 percent NiO.

4. A trifocal ophthalmic lens in which the fused middle segment glass has the calculated glass composition of claim 2.

5. A trifocal ophthalmic lens in which the fused middle segment glass has the calculated glass composition of claim 3.

References Cited by the Examiner

UNITED STATES PATENTS

| 2,676,109 | 4/1954 | Barnes et al. | 106—52 |
| 2,682,134 | 6/1954 | Stookey | 106—52 |
| 2,913,345 | 11/1959 | Duncan | 106—52 |

TOBIAS E. LEVOW, *Primary Examiner.*

H. McCARTHY, *Assistant Examiner.*